US012634076B2

(12) United States Patent
Smith et al.

(10) Patent No.: US 12,634,076 B2
(45) Date of Patent: May 19, 2026

(54) METHOD AND APPARATUS FOR COMMUNICATING INFORMATION VIA PILOT SIGNALS

(71) Applicant: Marvell Asia Pte Ltd, Singapore (SG)

(72) Inventors: Benjamin P. Smith, Ottawa (CA); Jamal Riani, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 377 days.

(21) Appl. No.: 18/511,794

(22) Filed: Nov. 16, 2023

(65) Prior Publication Data

US 2024/0163047 A1 May 16, 2024

Related U.S. Application Data

(60) Provisional application No. 63/425,936, filed on Nov. 16, 2022.

(51) Int. Cl.
H04L 5/00 (2006.01)

(52) U.S. Cl.
CPC .................................. H04L 5/0048 (2013.01)

(58) Field of Classification Search
CPC ... H04L 5/0048; H04L 1/0026; H04L 1/0025; H04L 1/0004; H04L 1/0071; H04L 5/005
See application file for complete search history.

(56) References Cited

U.S. PATENT DOCUMENTS 9,762,413 B2 9/2017 Srinivasa et al.
9,781,477 B2 10/2017 Mighani et al.

11,239,912 B2 2/2022 Rope et al.
11,392,534 B2 7/2022 Nagarajan
2008/0287155 A1 11/2008 Xu
2009/0060061 A1* 3/2009 Konishi ................ H04L 1/0001
                                            375/295
2010/0265999 A1* 10/2010 Stern ................. H04L 27/26265
                                            375/219
2013/0073749 A1 3/2013 Tremblay et al.
2014/0307675 A1* 10/2014 Xu ...................... H04W 52/241
                                            370/329
2019/0068349 A1 2/2019 Guo

OTHER PUBLICATIONS

International Search Report and Written Opinion for PCT Application No. PCT/US2023/080130, mailed Feb. 28, 2024. (12 pages).

* cited by examiner

*Primary Examiner* — Thai Nguyen

(57) ABSTRACT

A first communication device receives control data that are to be communicated to a transceiver of a second communication device, the control data for use by the transceiver to adjust one or more operating parameters of the transceiver. The first communication device encodes the control data on multiple pilot symbols so that each pilot symbol of the multiple pilot symbols encodes less than all of the multiple bits of control data. The first communication device receives information bits that are to be communicated to the second communication device via data symbols, and generates a plurality of data symbols using the information bits. The first communication device transmits the plurality of data symbols and the multiple pilot symbols to the second communication device via a communication medium. When transmitted, the multiple pilot symbols and encoded portions of the multiple bits of control data are interspersed among the plurality of data symbols.

24 Claims, 6 Drawing Sheets

*FIG. 6*

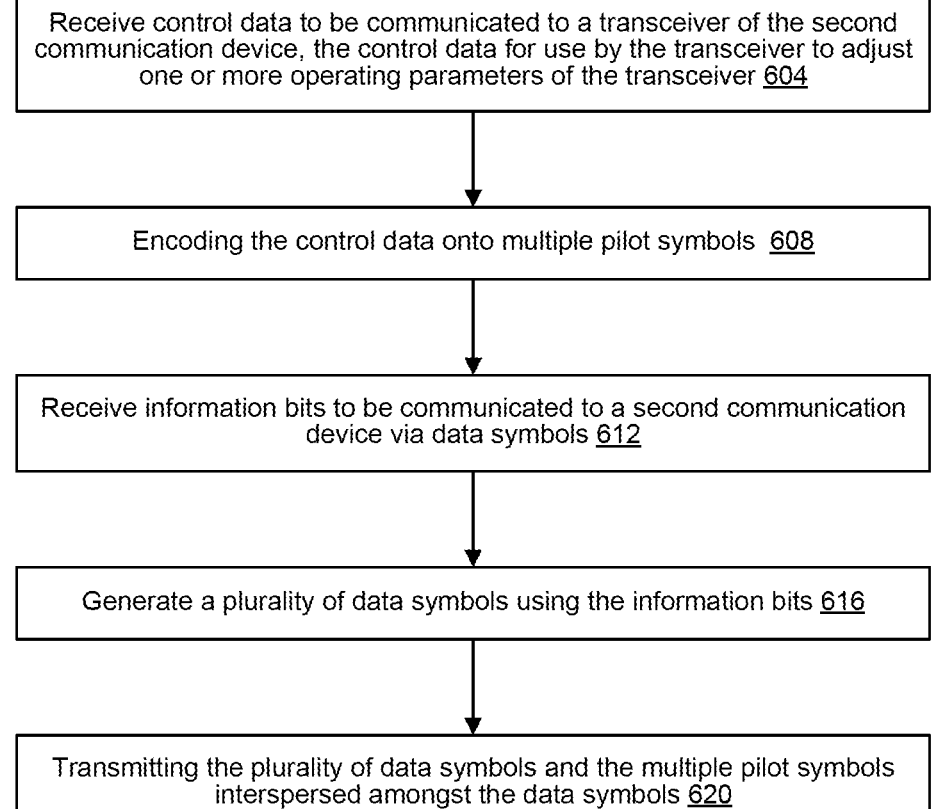

600

Receive control data to be communicated to a transceiver of the second communication device, the control data for use by the transceiver to adjust one or more operating parameters of the transceiver 604

Encoding the control data onto multiple pilot symbols 608

Receive information bits to be communicated to a second communication device via data symbols 612

Generate a plurality of data symbols using the information bits 616

Transmitting the plurality of data symbols and the multiple pilot symbols interspersed amongst the data symbols 620

METHOD AND APPARATUS FOR COMMUNICATING INFORMATION VIA PILOT SIGNALS

CROSS REFERENCES TO RELATED APPLICATIONS

This application claims the benefit of U.S. Provisional Patent App. No. 63/425,936, entitled "Pilot-Based Back-channel," filed on Nov. 16, 2022, the disclosure of which is expressly incorporated herein by reference in its entirety.

FIELD OF TECHNOLOGY

The present disclosure relates generally to communication networks, and more particularly to backchannel communications between transceivers.

BACKGROUND

In some communication systems, a first transceiver receives a signal from a second transceiver and measures signal quality parameters of the received signal, such as a signal-to-noise ratio (SNR), a bit error rate (BER), etc. The first transceiver includes "backchannel" information corresponding to the signal quality parameters in a header of a packet that is to be transmitted to the second transceiver. When the second transceiver receives the packet, the second transceiver extracts the backchannel information from the header and uses the backchannel information to adjust transmit operation of the second transceiver in an attempt to improve the quality of the signal transmitted by the second transceiver. An optical transceiver, for example, can adjust parameters of a laser in response to the backchannel information. The second transceiver then waits for subsequent backchannel information from the first transceiver to determine whether and/or how much signal improvement was achieved by the previous adjustment. This process is performed repeatedly in an attempt to improve the signal quality of the signal as received at the first transceiver. Thus, the use of such backchannel communications helps to improve signal quality, which improves data throughput.

SUMMARY

In an embodiment, a first communication device comprises a first transceiver that includes: data symbol generation circuitry configured to receive information bits that are to be communicated to a second communication device, and to generate a plurality of data symbols using the information bits; pilot encoding circuitry configured i) to receive multiple bits of control data that are to be communicated to a second transceiver of the second communication device, the control data being for use by the second transceiver to adjust one or more operating parameters of the second transceiver, and ii) to encode the multiple bits of control data onto multiple pilot symbols so that each pilot symbol of the multiple pilot symbols encodes less than all of the multiple bits of control data; pilot insertion circuitry configured to insert the multiple pilot symbols among the plurality of data symbols so that the multiple pilot symbols are interspersed among the plurality of data symbols and encoded portions of the multiple bits of control data are interspersed among the plurality of data symbols; and a transmitter configured to transmit the data symbols and the pilot symbols.

In another embodiment, a method for communicating information in a communication network includes: receiving, at a first communication device, multiple bits of control data that are to be communicated to a transceiver of a second communication device, the control data for use by the transceiver to adjust one or more operating parameters of the transceiver; encoding, at the first communication device, the multiple bits of control data on multiple pilot symbols among the plurality of pilot symbols so that each pilot symbol of the multiple pilot symbols encodes less than all of the multiple bits of control data; receiving, at the first communication device, information bits that are to be communicated to the second communication device via data symbols; generating, at the first communication device, a plurality of data symbols using the information bits; and transmitting, by the first communication device, the plurality of data symbols and the multiple pilot symbols to the second communication device via a communication medium, the multiple pilot symbols, when transmitted, being interspersed among the plurality of data symbols, and encoded portions of the multiple bits of control data, when transmitted, are interspersed among the plurality of data symbols.

BRIEF DESCRIPTION OF THE DRAWINGS

FIG. 6 is a flow diagram of an example method for communicating information in communication network via pilot symbols, according to an embodiment.

DETAILED DESCRIPTION

As discussed above, some communication systems use "backchannel" communication to help a transceiver to improve quality of a signal that the transceiver is transmitting. In conventional communication systems, backchannel information is communicated by transmitting the backchannel information in place of packet data that would otherwise have been transmitted, thus reducing the packet data throughput. For example, if the backchannel information is included in a packet, the overhead of the packet is increased leading to a decrease in the amount of packet data that can be included in the packet unless a length of the packet is increased. In other words, the packet data throughput is decreased when the backchannel information takes up transmission time that could otherwise be used for transmitting packet data.

In embodiments described below, backchannel information is transmitted by encoding the backchannel information onto pilot symbols that are distributed amongst data symbols that encode packet data. The pilot symbols correspond to reference symbols with predetermined and/or deterministic values known to a receiver. Pilot symbols conventionally are included in a transmit signal to improve performance of a receiver and/or simplify an architecture of the receiver. In embodiments described below, backchannel information is encoded onto the pilot symbols while maintaining the ability to use pilot symbols for their conventional purpose, e.g., to be used as reference symbols for improving performance and/or simplifying an architecture of a receiver of a communication device. Additionally, the backchannel information is used to improve performance of a transmitter of the first communication device, and because the backchannel information is encoded on pilot symbols, rather than transmitted in place of packet data, packet data throughput is not decreased (or is decreased significantly less as compared to conventional methods for transmitting backchannel information), at least in some embodiments. In accordance with some embodiments, pilot symbols transmitted by a local transmitter are used both i) to improve operation of a local receiver and/or simplify an architecture of the local receiver, and ii) to improve operation of a remote transmitter.

Figure 1:
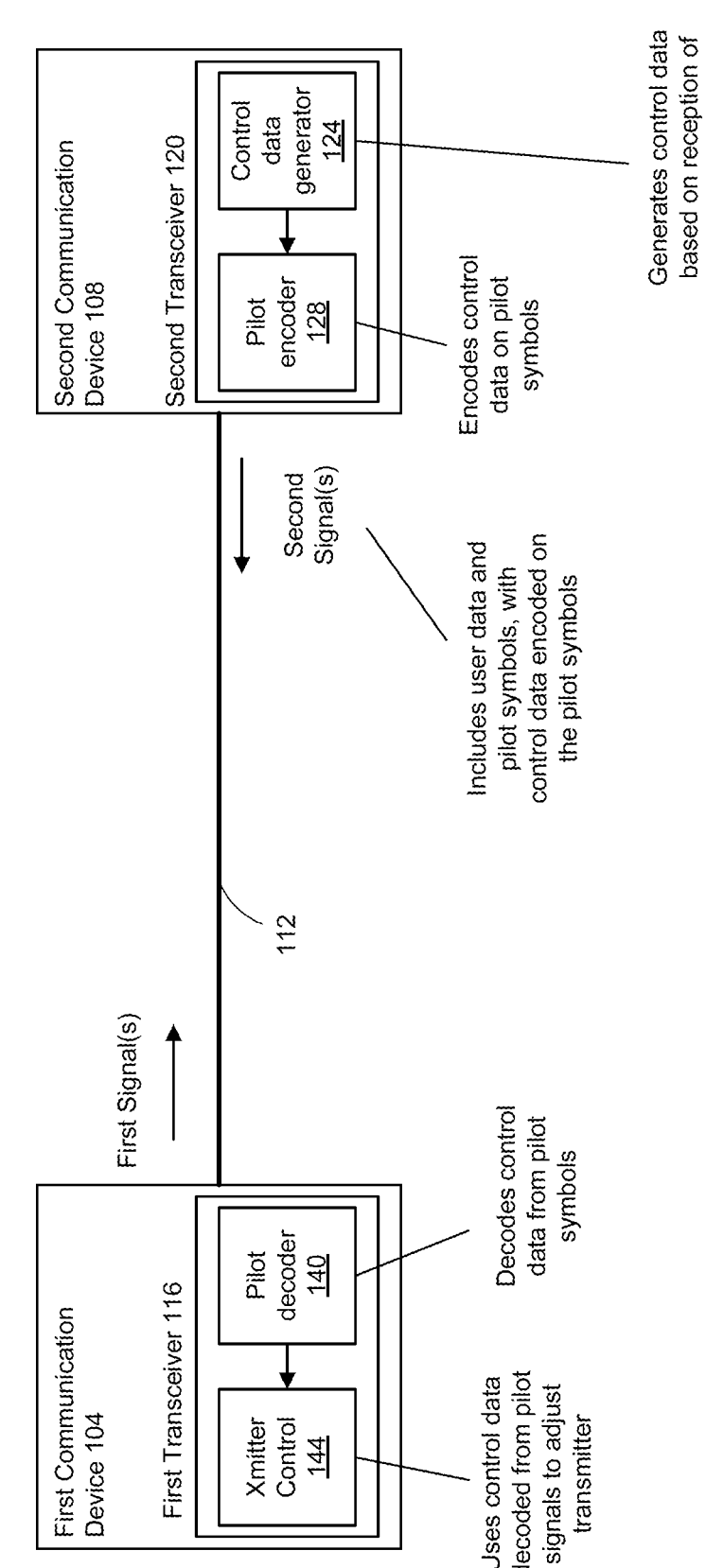
FIG. 1 is a simplified diagram of an example communication network in which control data is communicated via pilot symbols, according to an embodiment.

FIG. 1 is a simplified diagram showing an example communication network 100 in which various aspects, features, and elements described herein are implemented in accordance with an embodiment of this disclosure. The communication network 100 includes a first communication device 104 communicatively coupled to a second communication device 108 via a communication medium 112. The communication medium 112 comprises a fiber optic cable, in an embodiment. The communication medium 112 comprises another suitable communication medium in other embodiments, such as a cable with one or more twisted pairs of metallic wires, a coaxial cable, free space, etc.

The first communication device 104 includes a first transceiver 116 that is configured to transmit first signals to the second communication device 108 via the communication medium 112 and to receive second signals from the second communication device 108 via the communication medium 112. For example, the first transceiver 116 includes: i) transmit circuitry (not shown) that is configured to transmit the first signals, and ii) receive circuitry (not shown) that is configured to receive the second signals. Similarly, the second communication device 108 includes a second transceiver 120 that is configured to receive the first signals from the first communication device 104 via the communication medium 112 and to transmit the second signals to the first communication device 104 via the communication medium 112. For example, the second transceiver 120 includes: i) receive circuitry (not shown) that is configured to receive the first signals, and ii) transmit circuitry (not shown) that is configured to transmit the second signals.

The first transceiver 116 is configured to receive information bits and to generate data symbols that are encoded with the information bits. For example, one or more information bits are encoded on each data symbol. The information bits correspond to data from a layer of a protocol stack above a physical (PHY) layer, such as a medium access control (MAC) layer, a data link layer, etc. Generally, the format of the data symbols depends on the type of communication medium 112. Illustrative examples of data symbols for an optical medium 112 include optical on-off keying (OOK) symbols, pulse amplitude modulation (PAM) symbols, coherent modulation symbols such as optical binary phase shift keying (BPSK) symbols, optical quadrature phase shift keying (QPSK) symbols, dual polarization BPSK (DP-BPSK) symbols, optical quadrature amplitude modulation (QAM) symbols, etc. Illustrative examples of data symbols for a metallic cable medium 112 include OOK symbols, PAM symbols, BPSK symbols, QPSK symbols, QAM symbols, etc.

The first transceiver 116 is also configured to generate pilot symbols and to transmit the data symbols and pilot symbols so that the pilot symbols are interspersed among the data symbols. The pilot symbols correspond to reference symbols with predetermined and/or deterministic values known to the second transceiver 120. In some embodiments, the first transceiver 116 transmits the pilot symbols at predetermined locations within a sequence of data symbols and thus the second transceiver 120 knows the locations of the pilot symbols. The first signals include the data symbols and the pilot symbols, where the pilot symbols are included to improve performance of a receiver of the second transceiver 120 and/or to simplify an architecture of the receiver of the second transceiver 120, according to some embodiments. Generally, the format of the pilot symbols depends on the type of modulation that is utilized.

In an illustrative embodiment, the pilot symbols correspond to a deBruijn sequence of length $2^N$, where N is a suitable positive integer. In such embodiments, the deBruijn sequence is known to both the first transceiver 116 and the second transceiver 120. In an embodiment in which PAM modulation is utilized, each bit of the deBruijn sequence is mapped to one of two outer PAM symbols depending on a value of the bit. As an illustrative example that uses 4-level PAM symbols of levels from a set {−3, −1, +1, +3}, a bit value of zero is mapped to PAM symbol −3 and a bit value of one is mapped to PAM symbol +3. As another illustrative example that uses PAM symbols of levels from the set {−3, −1, +1, +3}, the bit value of zero is mapped to PAM symbol +3 and the bit value of one is mapped to PAM symbol −3.

In other embodiments, the pilot symbols correspond to other suitable bit sequences and/or symbol patterns known to both the first transceiver 116 and the second transceiver 120, such as a pseudorandom bit sequence.

Like the first transceiver 116, the second transceiver 120 is configured to receive information bits and to generate data symbols that are encoded with the information bits in a manner the same as or similar to the first transceiver 116. The second transceiver 120 is also configured to generate pilot symbols and to transmit the data symbols and pilot symbols so that the pilot symbols are interspersed among the data symbols in a manner the same as or similar to the first transceiver 116. The second signals include the data symbols and the pilot symbols, where the pilot symbols are included to improve performance of a receiver of the first transceiver 116 and/or to simplify an architecture of the receiver of the first transceiver 116, according to some embodiments.

The second transceiver 120 includes a control data generator 124 that is configured to generate control data based on signal quality measurements made by the second transceiver 120 in connection with the second transceiver 120 receiving the first signals. For example, the control data generator 124 generates control data based on one or more of i) a signal power of the received first signals, ii) a signal-to-noise ratio (SNR) of the received first signals, iii) a received signal strength indicator (RSSI) corresponding to the received first signals, iv) an error rate corresponding to the received first signals (e.g., a bit error rate (BER), a codeword error rate, etc.), etc. According to various embodiments, the second transceiver 120 includes one or more of i) a receive signal power sensor configured to generate an indication of the signal power of the received first signals, ii) circuitry configured to generate an indication of a SNR of the received first signals, iii) circuitry configured to generate an indication of an RSSI corresponding to the received first signals, iv) circuitry configured to generate an indication of an error rate corresponding to the received signals, etc.

As will be described further below, the control data is transmitted by the second transceiver 120 to the first transceiver 116, and the control data is intended to be used by the first transceiver 116 to adjust a transmitter of the first transceiver 116. In some embodiments, the control data includes one or more indicators of one or more signal quality measurements made by the second transceiver 120. In other embodiments, the control data additionally or alternatively includes one or more proposed adjustments to be made by the transmitter of the first transceiver 116. For example, the control data includes one or more of i) an indication of a proposed adjustment to a transmit power of the first signals, ii) an indication of a proposed adjustment to a transmit amplitude of the first signals, iii) an indication of a proposed adjustment to a modulation used for the first signals, iv) an indication of a proposed adjustment to a forward error correction (FEC) code used for the first signals, etc.

The second transceiver 120 includes a pilot encoder 128 that is configured to encode the control data on pilot symbols of the second signals. In an embodiment, the pilot encoder 128 encodes the control data on the pilot symbols in a manner that permits the pilot symbols to be used for their conventional purpose, e.g., to be used as reference symbols for improving performance and/or simplifying an architecture of a receiver of the first transceiver 116. In an embodiment, the pilot encoder 128 alternatively or additionally encodes the control data on the pilot symbols by modifying respective amplitudes of the pilot symbols. In such embodiments, the adjustments to the amplitudes of the pilot symbols are small enough such that the pilot symbols can be used for their conventional purpose. In another embodiment, the pilot encoder 128 encodes the control data on the pilot symbols additionally or alternatively by modifying respective phases of the pilot symbols. In such embodiments, the adjustments to the phases of the pilot symbols do not significantly affect the use of the pilot symbols for their conventional purpose.

The first transceiver 116 includes a pilot decoder 140 that is configured to decode the control data from the pilot symbols of the second signals. In an embodiment in which the pilot encoder 128 encodes the control data on the pilot symbols by modifying respective amplitudes of the pilot symbols, the pilot decoder 140 decodes the control data from the pilot symbols by analyzing respective amplitudes of the pilot symbols. In another embodiment in which the pilot encoder 128 encodes the control data on the pilot symbols additionally or alternatively by modifying respective phases of the pilot symbols, the pilot decoder 140 decodes the control data from the pilot symbols additionally or alternatively by analyzing respective phases of the pilot symbols.

The first transceiver 116 and the second transceiver 120 generate data symbols and pilot symbols that are configured for transmission via a wired communication medium, according to an embodiment. The first transceiver 116 and the second transceiver 120 generate data symbols and pilot symbols that are configured for transmission via a wired communication medium according to an Ethernet communication protocol, in an embodiment. The first transceiver 116 and the second transceiver 120 generate data symbols and pilot symbols that are configured for transmission via an optical communication medium (e.g., a fiber optic cable, free space, etc.), according to an embodiment. The first transceiver 116 and the second transceiver 120 generate data symbols and pilot symbols that are configured for transmission via an optical communication medium according to an Ethernet communication protocol, in an embodiment.

Figure 2:
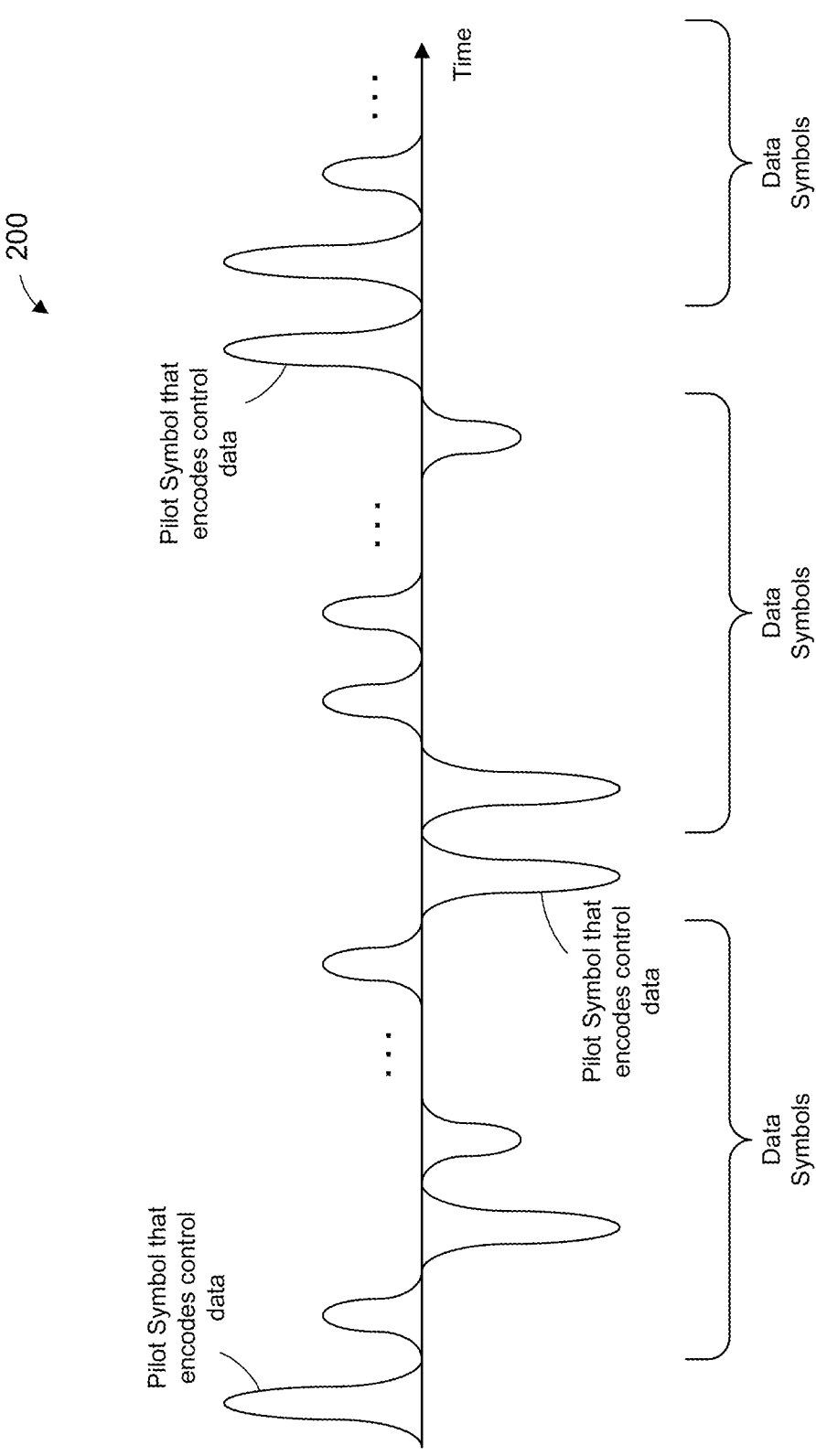
FIG. 2 is a simplified diagram of an example 4-level pulse amplitude modulation (PAM) signal transmitted by a communication device of FIG. 1, according to an embodiment.

FIG. 2 is a simplified diagram of an example 4-level PAM signal 200 transmitted by the second communication device 108 of FIG. 1, according to an embodiment. In other embodiments, the second signal transmitted by the second communication device 108 of FIG. 1 has another suitable format different than the 4-level PAM signal 200. Similarly, the 4-level PAM signal 200 is transmitted by another suitable communication device different than the second communication device 108 of FIG. 1, according to other embodiments.

The 4-level PAM signal 200 corresponds to the second signals of FIG. 1, in an embodiment. The 4-level PAM signal 200 includes pilot symbols interspersed among data symbols. The data symbols of levels take values from the set $\{-3, -1, +1, +3\}$, whereas the pilot symbols take values from the set $\{-3, +3\}$. Because the pilot symbols occur at predetermined locations within a sequence of data symbols, a receiver can distinguish the pilot symbols from data symbols, in some embodiments.

The pilot symbols correspond to a deBruijn sequence of length $2^N$, where N is a suitable positive integer, and the deBruijn sequence is known to both the first transceiver 116 and the second transceiver 120, in some embodiments. Each bit of the deBruijn sequence is mapped to either $-3$ or $+3$ depending on a value of the bit. For example, a bit value of zero of the is mapped to PAM symbol $-3$ and a bit value of one is mapped to PAM symbol $+3$. As another example, the bit value of zero is mapped to PAM symbol $+3$ and the bit value of one is mapped to PAM symbol $-3$.

Additionally, multiple bits of control data are encoded onto multiple ones of the pilot symbols. In some embodiments, an amplitude of a pilot symbol is adjusted according to a value of a bit of the control data. As an illustrative example, if control data bit is zero, the amplitude of the pilot symbol is adjusted by $-\Delta$; and if the control data bit is one, the amplitude of the pilot symbol is adjusted by $+\Delta$. As another illustrative example, if control data bit is zero, the amplitude of the pilot symbol is adjusted by $+\Delta$; and if the control data bit is one, the amplitude of the pilot symbol is adjusted by $-\Delta$. In other embodiments, the amplitude of a pilot symbol is adjusted according to a value of a bit of the control data in another suitable manner.

In some embodiments, the amplitude of a pilot symbol is adjusted according to a value of a set of multiple bits of the control data. As an illustrative example, if a set of two bits of the control data bit is 00, the amplitude of the pilot symbol is adjusted by $-3\Delta$; if the set of two bits of the control data bit is 01, the amplitude of the pilot symbol is adjusted by $-\Delta$; if the set of two bits of the control data bit is 10, the amplitude of the pilot symbol is adjusted by $+\Delta$; if the set of two bits of the control data bit is 11, the amplitude of the pilot symbol is adjusted by $+3\Delta$. In other embodiments, the amplitude of a pilot symbol is adjusted according to a value of a set of multiple bits of the control data in another suitable manner.

As in the example of FIG. 2, pilot symbols are transmitted at a significantly lower rate (e.g., at least an order of magnitude lower) as compared to a transmission rate of data symbols. Thus, significantly more information bits (e.g., at least an order of magnitude more) are communicated via data symbols for each bit of control data that is communicated via a pilot symbol in the manner described above. In some embodiments, block encoding is used for the control data and the same set of one or more control data bits are encoded on multiple pilot symbols to assist error correction at the receiver of the control data, which further reduces the transmission rate of the control data as compared to the transmission rate of information bits communicated via the data symbols.

Figure 3:
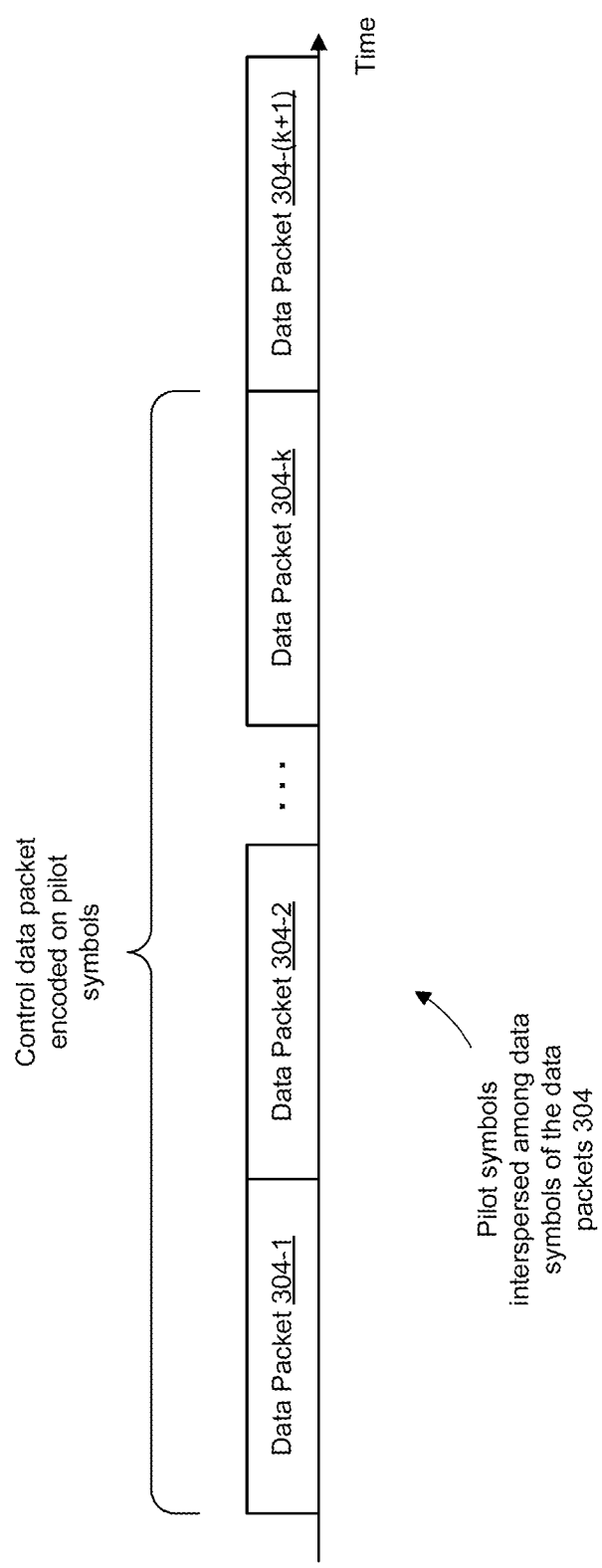
FIG. 3 is a timing diagram illustrating an example transmission of data packets by a communication device of FIG. 1, according to an embodiment.

In some embodiments, the control data are organized in first data units such as packets, frames, etc., and the information communicated via the data symbols are organized in second data units such as packets, frames, etc. Because the transmission rate of the control data is significantly lower than the transmission rate of data communicated via data symbols, pilot symbols corresponding to each first data unit may span multiple second data units. FIG. 3 is a timing diagram illustrating an example transmission of data packets 304 from the second communication device 108 to the first communication device 104 (FIG. 1), according to an embodiment. In the example of FIG. 3, control data are organized as control data packets, and information encoded on the data symbols are organized as data packets 304. As can be seen, each control data packet spans multiple data packets 304. Although in the example of FIG. 3 the control data packet is aligned with data packet boundaries 304, in other embodiments at least some control data packets are not aligned with data packet boundaries 304. In various embodiments, a control data packet includes one or both of: i) a control instruction (e.g., "increase transmit power," "decrease transmit power," etc.), ii) control information (e.g., SNR, RSSI, BER, etc.).

In some embodiments, each of at least some of the pilot symbols encodes a subset of the control data packet and thus no individual pilot symbol encodes a full control data packet; and pilot symbols (which collectively encode a control data packet) are interspersed among data symbols. Thus, a receiver collects multiple pilot symbols (where no individual pilot symbol encodes a full control data packet) interspersed among data symbols and decodes the control packet from the multiple pilot symbols, according to some embodiments.

In some embodiments, a same set of one or more bits of control data are encoded on each of multiple pilot symbols to provide redundancy. In some embodiments, a set of one or more bits of control data is considered as a control digit, and the control digit is encoded across multiple pilot symbols. As an illustrative example, a single bit of control data is encoded as a pattern across multiple pilot symbols, according to an embodiment.

Figure 4:
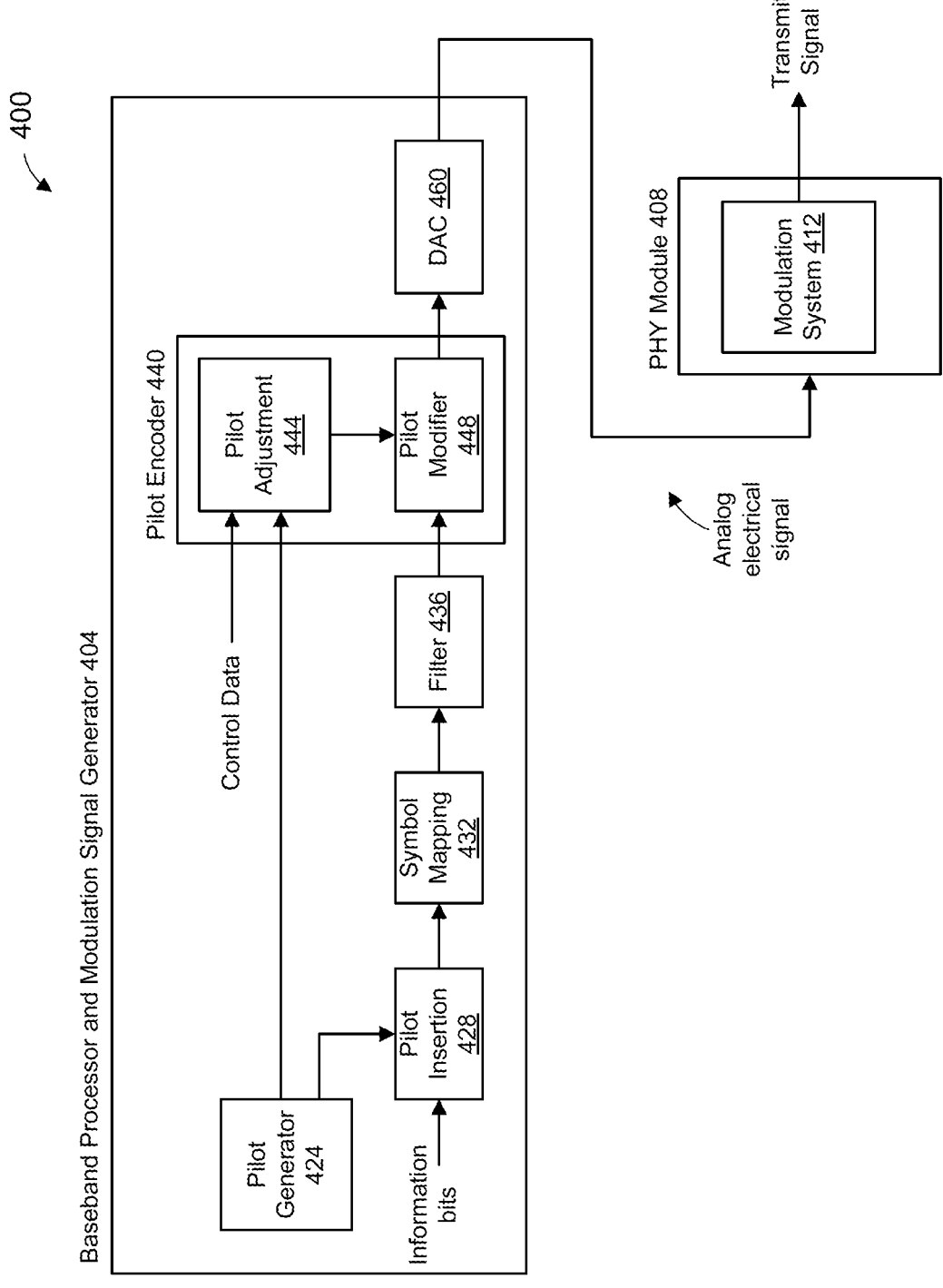
FIG. 4 is a simplified diagram of an example transmit portion of a transceiver that encodes control data on pilot symbols, according to an embodiment.

FIG. 4 is a simplified diagram of an example transmit portion 400 of a transceiver that encodes control data on pilot symbols, according to an embodiment. The transmit portion 400 is included in the second transceiver 120 of FIG. 1, in an embodiment. In other embodiments, a transmit portion of the second transceiver 120 of FIG. 1 has a suitable structure that is different than the transmit portion 400 of FIG. 4. In some embodiments, the transmit portion 400 is included in another suitable transceiver different than the second transceiver 120 of FIG. 1.

The transmit portion 400 includes a baseband processor and modulation signal generator 404 coupled to a PHY module 408. The PHY module 408 is configured to generate a transmit signal for transmission via the communication medium. The PHY module 408 is an optics PHY module, in an embodiment. The PHY module 408 is configured to generate an electrical signal for transmission via a metallic cable, in another embodiment. The PHY module 408 is configured to generate a radio frequency (RF) signal for wireless transmission over the air, in another embodiment.

The PHY module 408 includes a modulation system 412 that is configured to i) receive an analog electrical signal from the baseband processor and modulation signal generator 404, and ii) generate a transmit signal based on the electrical signal. In an embodiment, the modulation system 412 includes an optical modulator that modulates data symbols and pilot symbols such as described above onto an optical signal. In another embodiment, the modulation system 412 includes an RF upconverter that upconverts the data symbols and pilot symbols such as described above onto an RF signal.

In another embodiment in which the PHY module 408 generates an electrical signal for transmission via a metallic cable, the modulation system 412 is omitted. In some such embodiments, the PHY module 408 includes i) a serial-deserializer (SERDES) that receives a digital signal from the baseband processor and modulation signal generator 404, ii) a digital-to-analog converter (DAC) to convert the digital signal to an analog signal, and iii) a power amplifier configured to generate the transmit signal based on the analog signal.

The baseband processor and modulation signal generator 404 includes pilot generator circuitry 424 that is configured to generate bits that correspond to pilot symbols (referred to herein as "pilot bits" for brevity). In some embodiments, the bits generated by the pilot generator circuitry 424 correspond to a bit sequence known to the first communication device 104. In an embodiment, the bit sequence is a deBruijn sequence of length $2^N$. In other embodiments, the bit sequence is pseudo random bit sequence known to the first communication device 104. In other embodiments, the bit sequence is a suitable pattern of bits known to the first communication device 104.

Pilot insertion circuitry 428 is configured to receive i) information bits that are to be encoded on data symbols, and ii) pilot bits from the pilot generator circuitry 424. The pilot insertion circuitry 428 is configured to insert the pilot bits among the information bits so that the pilot bits are intersperse among the information bits. In an embodiment, the pilot insertion circuitry 428 inserts pilot bits i) at predetermined locations within the information bits and/or ii) at regular intervals.

Symbol mapping circuitry 432 receives an output bit stream of the pilot insertion circuitry 428 (e.g., information bits with inserted pilot bits) and is configured to map the bit stream to transmission symbols. In an embodiment that employs PAM modulation, the symbol mapping circuitry 432 maps the bit stream to PAM symbols. The output of the symbol mapping circuitry 432 includes data symbols and pilot symbols that are interspersed among the data symbols.

A filter 436 (e.g., a finite impulse response (FIR) filter, an infinite impulse response (IIR) filter, etc.) filters the transmit symbols output by the symbol mapping circuitry 432.

A pilot encoder 440 receives i) transmit symbols output by the filter 436, and ii) control data. The pilot encoder 440 is configured to encode the control data onto pilot symbols output by the filter 436. In an embodiment, the pilot encoder 440 also receives a pilot indicator signal from the pilot generator 424 that indicates locations of pilot symbols within the symbols output by the filter 436.

The pilot encoder 440 includes pilot adjustment generation circuitry 444 that is configured to generate adjustment values corresponding to the control data. In some embodiments that utilize PAM modulation, the adjustment values correspond to amplitude adjustments to be made to respective pilot symbols, where each adjustment value corresponds to a respective set of one or more bits of the control data. In some embodiments that utilize QAM or QPSK modulation, the adjustment values correspond to phase adjustments to be made to respective pilot symbols, where each adjustment value corresponds to a respective set of one or more bits of the control data.

The pilot encoder 440 also includes pilot modifier circuitry 448 that is configured to i) receive adjustment values from the adjustment generation circuitry 444, and ii) modify respective pilot symbols output by the filter 436 according to respective adjustment values from the adjustment generation circuitry 444. In some embodiments that utilize PAM modulation, the pilot modifier circuitry 448 modifies respective amplitudes of respective pilot symbols according to respective adjustment values output by the adjustment generation circuitry 444. In some embodiments that utilize QAM or QPSK modulation, the pilot modifier circuitry 448 modifies respective phases of respective pilot symbols according to respective adjustment values output by the adjustment generation circuitry 444.

In an embodiment, the pilot encoder 440 passes data symbols without modification. In another embodiment, data symbols bypass the pilot encoder 440.

A DAC 460 receives data symbols and pilot symbols output by the pilot encoder 440 as a digital signal, and converts the digital signal to an analog signal that is provided to the PHY module 108. In another embodiment in which the PHY module 408 includes a SERDES and a DAC, the DAC 460 is omitted from the baseband processor and modulation signal generator 404, and the baseband processor and modulation signal generator 404 includes another SERDES that provides the serial signal to the PHY module 408.

Figure 5:
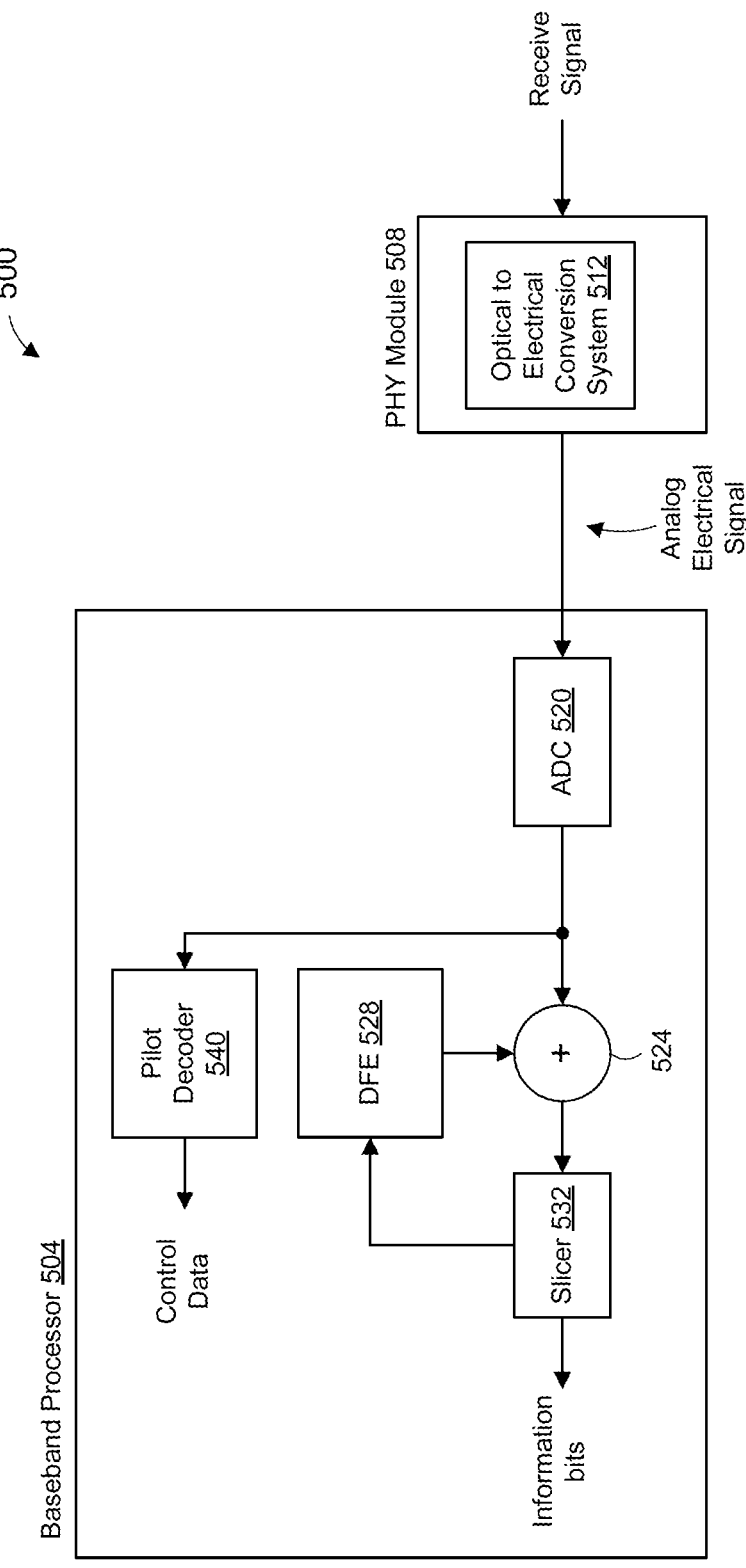
FIG. 5 is a simplified diagram of an example receive portion of a transceiver that decodes control data that was encoded on pilot symbols, according to an embodiment.

FIG. 5 is a simplified diagram of an example receive portion 500 of a transceiver that decodes control data that was encoded on pilot symbols, according to an embodiment. The receive portion 500 is included in the first transceiver 116 of FIG. 1, in an embodiment. In other embodiments, a receive portion of the first transceiver 116 of FIG. 1 has a suitable structure that is different than the receive portion 500 of FIG. 5. In some embodiments, the receive portion 500 is included in another suitable transceiver different than the first transceiver 116 of FIG. 1.

The receive portion 500 includes a baseband processor 504 coupled to a PHY module 508. The PHY module 508 is configured to receive a receive signal via the communication medium. The PHY module 508 is an optics PHY module that is configured to convert an optical receive signal from a fiber optic cable to an electrical analog signal, in an embodiment. The PHY module 508 is configured to convert an electrical receive signal from a metallic cable to a digital signal, in another embodiment. The PHY module 508 is configured to convert an electrical receive signal from a metallic cable to an electrical baseband signal, in another embodiment. The PHY module 508 is configured to convert an RF signal received wirelessly to a baseband signal or an intermediate frequency signal, in other embodiments.

The baseband processor 504 includes an analog-to-digital converter (ADC) 520 that is configured to convert an analog signal from the PHY module 508 to a digital receive signal. In another embodiment, the ADC 520 is included in the PHY module 508. In some embodiments in which the ADC 520 is included in the PHY module 508, the baseband processor 504 and the PHY module 508 include respective SERDES and the digital receive signal is communicated from the PHY module 508 to the baseband processor 504 via the SERDES.

An adder 524 receives the digital receive signal and combines the digital receive signal with an output from a decision feedback equalizer (DFE) 528. A slicer 532 receives an output of the adder 524 and converts data symbols to information bits. The DFE 528 receives decisions made by the slicer 532 and uses the decisions to output adjustments to the digital receive signal, which are used by the adder 524 to modify the digital receive signal.

A pilot decoder 540 also receives the digital receive signal and decodes control data from pilot symbols in the digital receive signal. For example, because the pilot symbols, when not encoded with control data, are reference symbols with predetermined and/or deterministic values known to pilot decoder 540, the pilot decoder 540 is configured to compares pilot symbols in the digital receive signal with corresponding reference pilot symbols and decodes control data based on the comparisons. In some embodiments in which the control data is encoded by modifying respective amplitudes of pilot symbols, the pilot decoder 540 compares amplitudes of respective pilot symbols in the digital receive signal with amplitudes of respective reference pilot symbols, and uses the comparisons to decode control data from the pilot symbols. In some embodiments in which the control data is encoded by modifying respective phases of pilot symbols, the pilot decoder 540 compares phases of respective pilot symbols in the digital receive signal with phases of respective reference pilot symbols, and uses the comparisons to decode control data from the pilot symbols.

FIG. 6 is a flow diagram of an example method 600 for communicating information in communication network via pilot symbols, according to an embodiment. The method 600 is implemented in the communication network 100 of FIG. 1, according to an embodiment. Additionally or alternatively, the method 600 is implemented using a transmit portion of transceiver such as the transmit portion 400 of FIG. 4, in some embodiments. FIG. 6 is described with reference to FIGS. 1 and 4 for ease of explanation. In other embodiments, the method 600 is implemented in another suitable communication network different than the communication network 100 of FIG. 1, and/or using another suitable transmit portion of a transceiver different than the transmit portion 400 of FIG. 4.

At block 604, a first communication device receives control data that is to be communicated to a transceiver of a second communication device. For example, the pilot encoder 128 receives control data. As another example, the pilot encoder 440 receives control data. The control data is for use by the transceiver to adjust one or more operating parameters of the transceiver, in an embodiment. For example, the control data includes one or more indicators of signal quality of a signal that was transmitted by the second communication device and received at the first communication device. As another example, the control data includes one or more indicators of one or more proposed changes to one or more operating parameters of the transceiver of the second communication device.

At block 608, the first communication device encodes the control data on multiple pilot symbols that are to be transmitted to the second communication device. For example, the pilot encoder 128 encodes the control data on multiple pilot symbols. As another example, the pilot encoder 440 encodes the control data on multiple pilot symbols. The pilot symbols, when not encoded with control data, are reference symbols with predetermined and/or deterministic values known to the transceiver of the second communication device, according to an embodiment. For example, the pilot symbols correspond to a deBruijn sequence of length $2^N$, where N is a suitable positive integer, and where the deBruijn sequence is known to the transceiver of the second communication device. The pilot symbols correspond to a pseudo random sequence known to the transceiver of the second communication device, according to another embodiment. The pilot symbols correspond to a pattern of values known to the transceiver of the second communication device, according to another embodiment.

Encoding the control data on multiple pilot symbols at block 608 comprises adjusting respective amplitudes of respective pilot symbols, where each adjustment to an amplitude of a respective pilot symbol corresponds to a set of one or more bits of the control data, according to an embodiment. Encoding the control data on multiple pilot symbols at block 608 comprises adjusting respective phases of respective pilot symbols, where each adjustment to a phase of a respective pilot symbol corresponds to a set of one or more bits of the control data, according to an embodiment.

At block 612, the first communication device receives information bits that are to be communicated to the second communication device via data symbols. For example, the second transceiver 120 receives information bits that are to be communicated to the first transceiver 116 via data symbols. As another example, the baseband processor and modulation signal generator 404 receives information bits that are to be communicated to the first transceiver 116 via data symbols. The information bits correspond to data from a layer of a protocol stack above a PHY layer, in an embodiment. In an embodiment, the information bits correspond to data from a MAC layer of the protocol stack. In another embodiment, the information bits correspond to data from a data link layer of the protocol stack.

At block 616, the first communication device generates (e.g., the second transceiver 120 generates, the baseband processor and modulation signal generator 404 generates, etc.) a plurality of data symbols based on the information bits received at block 612. For example, the first communication generates the plurality of data symbols to encode the information bits on the data symbols. In an embodiment, the data symbols are amplitude modulated symbols. In another embodiment, the data symbols are phase modulated symbols. In another embodiment, the data symbols are amplitude and phase modulated symbols.

At block 620, the first communication device transmits (e.g., the second transceiver 120 transmits, the PHY module 408 transmits, etc.) the plurality of data symbols and the multiple pilot symbols so that the multiple pilot symbols are interspersed among the data symbols. In an embodiment, the pilot symbols occur at predetermined locations within a sequence of data symbols when transmitted. In another embodiment, the pilot symbols occur at regular intervals within the sequence of data symbols when transmitted.

In an embodiment, the information bits received at block 612 are organized in a plurality of first data units, and the control data received at block 604 is organized in one or more second data units. In some embodiments, encoding the control data on the multiple pilot symbols at block 608 comprises encoding control data corresponding to one second data unit on a set of pilot symbols that is interspersed among data symbols corresponding to multiple first data units when transmitted.

Embodiment 1: A first communication device, comprising a first transceiver that includes: data symbol generation circuitry configured to receive information bits that are to be communicated to a second communication device, and to generate a plurality of data symbols using the information bits; pilot encoding circuitry configured i) to receive multiple bits of control data that are to be communicated to a second transceiver of the second communication device, the control data being for use by the second transceiver to adjust one or more operating parameters of the second transceiver, and ii) to encode the multiple bits of control data onto multiple pilot symbols so that each pilot symbol of the multiple pilot symbols encodes less than all of the multiple bits of control data; pilot insertion circuitry configured to insert the multiple pilot symbols among the plurality of data symbols so that the multiple pilot symbols are interspersed among the plurality of data symbols and encoded portions of the multiple bits of control data are interspersed among the plurality of data symbols; and a transmitter configured to transmit the data symbols and the pilot symbols.

Embodiment 2: The first communication device of embodiment 1, wherein: the information bits are organized in a plurality of first data units; the control data is organized in one or more second data units; and the pilot insertion circuitry is configured to insert pilot symbols corresponding to one second data unit among data symbols corresponding to multiple first data units.

Embodiment 3: The first communication device of either of embodiments 1 or 2, wherein the pilot encoding circuitry is configured to: encode control data on a sequence of pilot symbols that, prior to the encoding, have values known to the transceiver of the second communication device.

Embodiment 4: The first communication device of any of embodiments 1-3, wherein the pilot encoding circuitry is configured to: adjust respective amplitudes of respective pilot symbols, where each adjustment to an amplitude of a respective pilot symbol corresponds to a set of one or more bits of the control data.

Embodiment 5: The first communication device of any of embodiments 1-4, wherein the pilot encoding circuitry is configured to: adjust respective phases of respective pilot symbols, where each adjustment to a phase of a respective pilot symbol corresponds to a set of one or more bits of the control data, according to an embodiment.

Embodiment 6: The first communication device of any of embodiments 1-5, wherein the pilot encoding circuitry comprises: adjustment generation circuitry configured to receive the control data and to generate respective adjustments to the multiple pilot symbols based on the control data; and pilot modification circuitry configured to modify the multiple pilot symbols according to the respective modifications.

Embodiment 7: The first communication device of embodiment 6, wherein: the adjustment generation circuitry is configured generate the respective adjustments as respective amplitude adjustments to the multiple pilot symbols based on the control data; and the pilot modification circuitry is configured to modify respective amplitudes of the multiple pilot symbols according to the respective amplitude adjustments.

Embodiment 8: The first communication device of any of embodiments 1-7, wherein: the pilot insertion circuitry is configured to insert pilot bits corresponding to pilot symbols into a bitstream corresponding to the information bits so that the pilot bits are interspersed among information bits in the bitstream; and the first transceiver further comprises symbol mapping circuitry configured to i) map information bits in the bitstream to data symbols, and ii) map pilot bits in the bitstream to pilot symbols.

Embodiment 9: The first communication device of any of embodiments 1-8, wherein the pilot encoding circuitry is configured to: receive control data that includes one or more indications of signal quality of a signal transmitted by the second transceiver of the second communication device and received at the first communication device.

Embodiment 10: The first communication device of any of embodiments 1-9, wherein the pilot encoding circuitry is configured to: receive control data that includes one or more indications of one or more proposed adjustments to one or more operating parameters of the transceiver of the second communication device.

Embodiment 11: The first communication device of any of embodiments 1-10, wherein: the data symbol generation circuitry is configured to generate the plurality of data symbols for transmission via a wired communication medium; and the pilot encoding circuitry is configured to encode the multiple bits of control data onto multiple pilot symbols that are configured for transmission via the wired communication medium.

Embodiment 12: The first communication device of any of embodiments 1-11, wherein: the data symbol generation circuitry is configured to generate the plurality of data symbols for transmission via an optical communication medium; and the pilot encoding circuitry is configured to encode the multiple bits of control data onto multiple pilot symbols that are configured for transmission via the optical communication medium.

Embodiment 13: A method for communicating information in a communication network, the method comprising: receiving, at a first communication device, multiple bits of control data that are to be communicated to a transceiver of a second communication device, the control data for use by the transceiver to adjust one or more operating parameters of the transceiver; encoding, at the first communication device, the multiple bits of control data on multiple pilot symbols among the plurality of pilot symbols so that each pilot symbol of the multiple pilot symbols encodes less than all of the multiple bits of control data; receiving, at the first communication device, information bits that are to be communicated to the second communication device via data symbols; generating, at the first communication device, a plurality of data symbols using the information bits; and transmitting, by the first communication device, the plurality of data symbols and the multiple pilot symbols to the second communication device via a communication medium, the multiple pilot symbols, when transmitted, being interspersed among the plurality of data symbols, and encoded portions of the multiple bits of control data, when transmitted, are interspersed among the plurality of data symbols.

Embodiment 14: The method of embodiment 13, wherein: the information bits are organized in a plurality of first data units; the control data is organized in one or more second data units; and encoding the control data on the multiple pilot symbols comprises encoding control data corresponding to one second data unit on a set of pilot symbols that is interspersed, when transmitted, among data symbols corresponding to multiple first data units.

Embodiment 15: The method of either of embodiments 13 or 14, wherein encoding the control data on the multiple pilot symbols comprises: encoding control data on a sequence of pilot symbols that, prior to the encoding, have values known to the transceiver of the second communication device.

Embodiment 16: The method of any of embodiments 13-15, wherein encoding the control data on the multiple pilot symbols comprises: adjusting respective amplitudes of respective pilot symbols, where each adjustment to an amplitude of a respective pilot symbol corresponds to a set of one or more bits of the control data.

Embodiment 17: The method of any of embodiments 13-16, wherein encoding the control data on the multiple pilot symbols comprises: adjusting respective phases of respective pilot symbols, where each adjustment to a phase of a respective pilot symbol corresponds to a set of one or more bits of the control data, according to an embodiment.

Embodiment 18: The method of any of embodiments 13-17, wherein encoding the control data on the multiple pilot symbols comprises: determining, at the first communication device, respective adjustments to the multiple pilot symbols based on the control data; and modifying, at the first communication device, the multiple pilot symbols according to the respective adjustments.

Embodiment 19: The method of any of embodiments 13-18, wherein: determining respective adjustments to the multiple pilot symbols comprises determining respective amplitude adjustments to the multiple pilot symbols based on the control data; and modifying the multiple pilot symbols comprises modifying respective amplitudes of the multiple pilot symbols according to the respective amplitude adjustments.

Embodiment 20: The method of any of embodiments 13-19, further comprising: inserting, by the first communication device, pilot bits corresponding to pilot symbols into a bitstream corresponding to the information bits so that the pilot bits are interspersed among information bits in the bitstream; mapping, by the first communication device, information bits in the bitstream to data symbols; and mapping, by the first communication device, pilot bits in the bitstream to pilot symbols.

Embodiment 21: The method of any of embodiments 13-20, wherein receiving the control data comprises: receiving one or more indications of signal quality of a signal transmitted by the transceiver of the second communication device and received at the first communication device.

Embodiment 22: The method of any of embodiments 13-21, wherein receiving the control data comprises: receiving one or more indications of one or more proposed adjustments to one or more operating parameters of the transceiver of the second communication device.

Embodiment 23: The method of any of embodiments 13-22, wherein: generating the plurality of data symbols comprises generating data symbols configured for transmission via a wired communication medium; and encoding the multiple bits of control data onto the multiple pilot symbols comprises encoding the multiple bits of control data onto multiple pilot symbols that are configured for transmission via the wired communication medium; and transmitting the plurality of data symbols and the multiple pilot symbols comprises transmitting the plurality of data symbols and the multiple pilot symbols via the wired communication medium.

Embodiment 24: The method of any of embodiments 13-23, wherein: generating the plurality of data symbols comprises generating data symbols configured for transmission via an optical communication medium; encoding the multiple bits of control data onto the multiple pilot symbols comprises encoding the multiple bits of control data onto multiple pilot symbols that are configured for transmission via the optical communication medium; and transmitting the plurality of data symbols and the multiple pilot symbols comprises transmitting the plurality of data symbols and the multiple pilot symbols via the optical communication medium.

Embodiment 25: The first communication device comprising a transceiver that is configured to perform any of the methods of embodiments 13-24.

Some of the various blocks, operations, and techniques described above may be implemented utilizing hardware, a processor executing firmware instructions, a processor executing software instructions, or any suitable combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts such as described above.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first communication device, comprising:
a first transceiver, including:
    data symbol generation circuitry configured to receive information bits that are to be communicated to a second communication device, and to generate a plurality of data symbols using the information bits,
    pilot encoding circuitry configured i) to receive multiple bits of control data that are to be communicated to a second transceiver of the second communication device, the control data being for use by the second transceiver to adjust one or more operating parameters of the second transceiver, and ii) to encode the multiple bits of control data onto multiple pilot symbols so that each pilot symbol of the multiple pilot symbols encodes less than all of the multiple bits of control data,
    pilot insertion circuitry configured to insert the multiple pilot symbols among the plurality of data symbols so that the multiple pilot symbols are interspersed among the plurality of data symbols and encoded portions of the multiple bits of control data are interspersed among the plurality of data symbols, and
    a transmitter configured to transmit the data symbols and the pilot symbols.

2. The first communication device of claim 1, wherein:
the information bits are organized in a plurality of first data units;
the control data is organized in one or more second data units; and
the pilot insertion circuitry is configured to insert pilot symbols corresponding to one second data unit among data symbols corresponding to multiple first data units.

3. The first communication device of claim 1, wherein the pilot encoding circuitry is configured to:
encode control data on a sequence of pilot symbols that, prior to the encoding, have values known to the transceiver of the second communication device.

4. The first communication device of claim 1, wherein the pilot encoding circuitry is configured to:
adjust respective amplitudes of respective pilot symbols, where each adjustment to an amplitude of a respective pilot symbol corresponds to a set of one or more bits of the control data.

5. The first communication device of claim 1, wherein the pilot encoding circuitry is configured to:
adjust respective phases of respective pilot symbols, where each adjustment to a phase of a respective pilot symbol corresponds to a set of one or more bits of the control data, according to an embodiment.

6. The first communication device of claim 1, wherein the pilot encoding circuitry comprises:
adjustment generation circuitry configured to receive the control data and to generate respective adjustments to the multiple pilot symbols based on the control data; and
pilot modification circuitry configured to modify the multiple pilot symbols according to the respective modifications.

7. The first communication device of claim 6, wherein:
the adjustment generation circuitry is configured generate the respective adjustments as respective amplitude adjustments to the multiple pilot symbols based on the control data; and
the pilot modification circuitry is configured to modify respective amplitudes of the multiple pilot symbols according to the respective amplitude adjustments.

8. The first communication device of claim 1, wherein:
the pilot insertion circuitry is configured to insert pilot bits corresponding to pilot symbols into a bitstream corresponding to the information bits so that the pilot bits are interspersed among information bits in the bitstream; and
the first transceiver further comprises symbol mapping circuitry configured to i) map information bits in the bitstream to data symbols, and ii) map pilot bits in the bitstream to pilot symbols.

9. The first communication device of claim 1, wherein the pilot encoding circuitry is configured to:
receive control data that includes one or more indications of signal quality of a signal transmitted by the second transceiver of the second communication device and received at the first communication device.

10. The first communication device of claim 1, wherein the pilot encoding circuitry is configured to:
receive control data that includes one or more indications of one or more proposed adjustments to one or more operating parameters of the transceiver of the second communication device.

11. The first communication device of claim 1, wherein:
the data symbol generation circuitry is configured to generate the plurality of data symbols for transmission via a wired communication medium; and
the pilot encoding circuitry is configured to encode the multiple bits of control data onto multiple pilot symbols that are configured for transmission via the wired communication medium.

12. The first communication device of claim 1, wherein:
the data symbol generation circuitry is configured to generate the plurality of data symbols for transmission via an optical communication medium; and
the pilot encoding circuitry is configured to encode the multiple bits of control data onto multiple pilot symbols that are configured for transmission via the optical communication medium.

13. A method for communicating information in a communication network, the method comprising:
receiving, at a first communication device, multiple bits of control data that are to be communicated to a transceiver of a second communication device, the control data for use by the transceiver to adjust one or more operating parameters of the transceiver;
encoding, at the first communication device, the multiple bits of control data on multiple pilot symbols among the plurality of pilot symbols so that each pilot symbol of the multiple pilot symbols encodes less than all of the multiple bits of control data;
receiving, at the first communication device, information bits that are to be communicated to the second communication device via data symbols;
generating, at the first communication device, a plurality of data symbols using the information bits; and
transmitting, by the first communication device, the plurality of data symbols and the multiple pilot symbols to the second communication device via a communication medium, the multiple pilot symbols, when transmitted, being interspersed among the plurality of data symbols, and encoded portions of the multiple bits of control data, when transmitted, being interspersed among the plurality of data symbols.

14. The method of claim 13, wherein:
the information bits are organized in a plurality of first data units;
the control data is organized in one or more second data units; and
encoding the control data on the multiple pilot symbols comprises encoding control data corresponding to one second data unit on a set of pilot symbols that is interspersed, when transmitted, among data symbols corresponding to multiple first data units.

15. The method of claim 13, wherein encoding the control data on the multiple pilot symbols comprises:
encoding control data on a sequence of pilot symbols that, prior to the encoding, have values known to the transceiver of the second communication device.

16. The method of claim 13, wherein encoding the control data on the multiple pilot symbols comprises:
adjusting respective amplitudes of respective pilot symbols, where each adjustment to an amplitude of a respective pilot symbol corresponds to a set of one or more bits of the control data.

17. The method of claim 13, wherein encoding the control data on the multiple pilot symbols comprises:
adjusting respective phases of respective pilot symbols, where each adjustment to a phase of a respective pilot symbol corresponds to a set of one or more bits of the control data, according to an embodiment.

18. The method of claim 13, wherein encoding the control data on the multiple pilot symbols comprises:
determining, at the first communication device, respective adjustments to the multiple pilot symbols based on the control data; and
modifying, at the first communication device, the multiple pilot symbols according to the respective adjustments.

19. The method of claim 18, wherein:
determining respective adjustments to the multiple pilot symbols comprises determining respective amplitude adjustments to the multiple pilot symbols based on the control data; and
modifying the multiple pilot symbols comprises modifying respective amplitudes of the multiple pilot symbols according to the respective amplitude adjustments.

20. The method of claim 13, further comprising:
inserting, by the first communication device, pilot bits corresponding to pilot symbols into a bitstream corresponding to the information bits so that the pilot bits are interspersed among information bits in the bitstream;
mapping, by the first communication device, information bits in the bitstream to data symbols; and
mapping, by the first communication device, pilot bits in the bitstream to pilot symbols.

21. The method of claim 13, wherein receiving the control data comprises:
receiving one or more indications of signal quality of a signal transmitted by the transceiver of the second communication device and received at the first communication device.

22. The method of claim 13, wherein receiving the control data comprises:
receiving one or more indications of one or more proposed adjustments to one or more operating parameters of the transceiver of the second communication device.

23. The method of claim 13, wherein:
generating the plurality of data symbols comprises generating data symbols configured for transmission via a wired communication medium; and
encoding the multiple bits of control data onto the multiple pilot symbols comprises encoding the multiple bits of control data onto multiple pilot symbols that are configured for transmission via the wired communication medium; and
transmitting the plurality of data symbols and the multiple pilot symbols comprises transmitting the plurality of data symbols and the multiple pilot symbols via the wired communication medium.

24. The method of claim 13, wherein:
generating the plurality of data symbols comprises generating data symbols configured for transmission via an optical communication medium;
encoding the multiple bits of control data onto the multiple pilot symbols comprises encoding the multiple bits of control data onto multiple pilot symbols that are configured for transmission via the optical communication medium; and
transmitting the plurality of data symbols and the multiple pilot symbols comprises transmitting the plurality of data symbols and the multiple pilot symbols via the optical communication medium.

* * * * *